April 19, 1927.

A. B. FAIRCHILD 1,625,717

GREASE CUP VALVE

Filed July 14, 1926

A. B. Fairchild
INVENTOR

BY Victor J. Evans
ATTORNEY

Patented Apr. 19, 1927.

1,625,717

UNITED STATES PATENT OFFICE.

ARTHUR B. FAIRCHILD, OF BUHL, IDAHO.

GREASE-CUP VALVE.

Application filed July 14, 1926. Serial No. 122,428.

This invention relates to improvements in grease cups, the general object of the invention being to provide means for preventing a vacuum occurring in the cup when the cup is removed for the purpose of refilling, which vacuum tends to draw the lubricant from the bearing.

Another object of the invention is to provide means whereby the vacuum can be broken when the cup is being removed by pressure of the fingers or finger on a part of the device.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

In these views, 1 indicates the base part of the cup which is formed with a nipple 2 so that it can be screwed into a threaded hole formed in the bearing. The compression cap is shown at 3, and has its internal threads engaging the external threads of the base part 1. Thus as the cap is screwed down on the base 1, the lubricant therein will be forced therefrom into the bearing. As before stated, when the device is removed for refilling purposes, a suction is created within the device which has a tendency to cause the lubricant in the bearing to return to the cup, and it is the object of my invention to prevent this.

Figure 1:
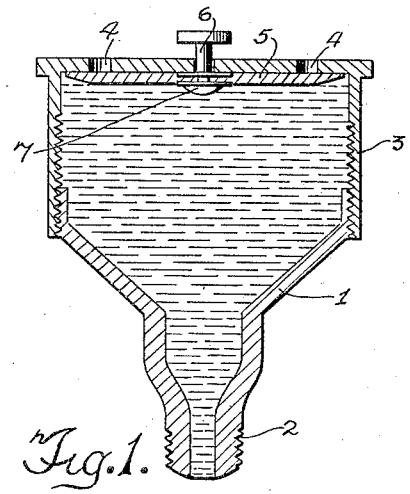
Figure 1 is a sectional view through a cup which is provided with one form of the invention.
Figure 2:
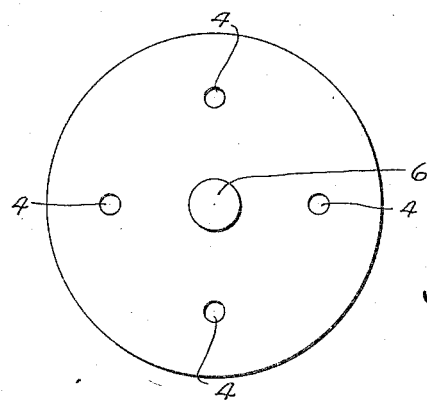
Figure 2 is a plan view of the cup shown in Figure 1.
Figure 3:
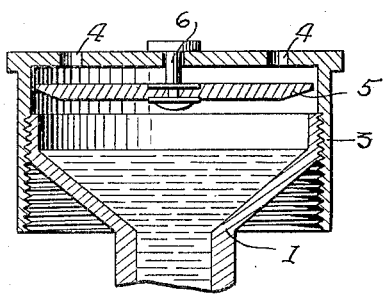
Figure 3 is a view similar to Figure 1, but showing the parts in a position to prevent a vacuum occurring in the cup.

In Figures 1, 2 and 3. I form openings 4 in the top of the cap 3 and I place a washer 5 on the inner face of the top of the cap which closes these openings and prevents lubricant from escaping therefrom. A headed stud 6 passes through a central perforation in the top of the cap and is attached to the washer, as shown at 7. The stud is of sufficient length to space the washer from the inner face of the top of the cap when the head of the stud engages the outer face of the cap, as shown in Figure 2. Thus it will be seen that when the cap is to be withdrawn by pressing on the head of the stud, the washer is moved downwardly or inwardly so that the air can enter the cap and thus prevent any vacuum from occurring therein, which would tend to return the lubricant in the bearing to the cap. This washer will prevent the escape of lubricant from the cap when the same is being turned down to force lubricant into the bearing, and in most cases the washer will open automatically when a vacuum starts to form in the cup, but if it should not, slight pressure on the head of the stud will open it.

Figure 4:
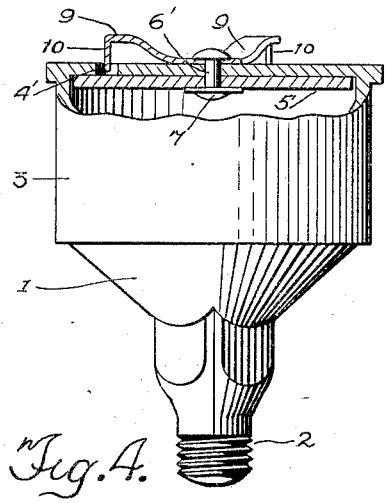
Figure 4 is an elevation with parts broken away showing a modification.
Figure 5:
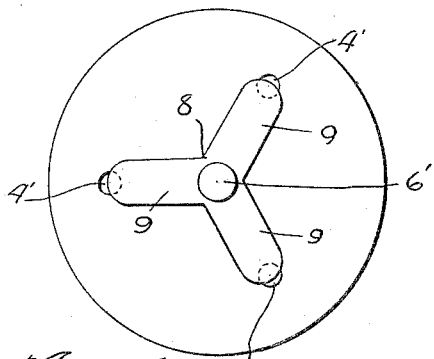
Figure 5 is a plan view of this modification.

In Figures 4 and 5, the washer 5' is formed of flexible material so that the stud 6' holds the central part of the washer snugly against the top of the cap. This stud also holds in place a clip 8 which is formed with three arms 9, each of which carries a pin 10. These pins extend into perforations 4' formed in the top of the cap. Thus by pressing upon any one of these arms, the pin thereon will be pressed against the washer to force a portion thereof away from the top of the cap so that air can enter the cap.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A grease cup having perforations in the end of its cap, a washer closing the perforations and manually operated means for moving the washer away from the perforations to permit air to enter the cap.

2. A grease cup having perforations in the end of its cap, a washer in the cap and adapted to engage the inner face of the cap to close the perforations, a stud passing through the center of the cap and slidably mounted therein, with its inner end fastened to the washer so that the washer can be moved away from the perforations to permit air to enter the cap by pushing the stud inwardly.

In testimony whereof I affix my signature.

ARTHUR B. FAIRCHILD.